United States Patent [19]
Martin

[11] 3,945,929
[45] Mar. 23, 1976

[54] PROCESS FOR THE SECONDARY OR TERTIARY RECOVERY OF PETROLEUM
[75] Inventor: Fred David Martin, McMurray, Pa.
[73] Assignee: Calgon Corporation, Pittsburgh, Pa.
[22] Filed: May 8, 1974
[21] Appl. No.: 468,035

[52] U.S. Cl. ............................ 252/8.55 D; 166/275
[51] Int. Cl.² .................... E21B 43/20; E21B 43/22
[58] Field of Search ....... 252/8.55 D; 166/273, 274, 166/275

[56] References Cited
UNITED STATES PATENTS

| | | | |
|---|---|---|---|
| 2,328,901 | 9/1943 | Grimm et al. | 260/72 |
| 3,085,063 | 4/1963 | Turbak | 252/8.55 |
| 3,343,601 | 9/1967 | Pye | 166/275 X |
| 3,539,535 | 11/1970 | Wisner | 260/72 |
| 3,679,000 | 7/1972 | Kaufman | 252/8.55 X |
| 3,800,877 | 4/1974 | Knight | 166/274 X |
| 3,850,244 | 11/1974 | Rhudy et al. | 166/273 |

Primary Examiner—Herbert B. Guynn
Attorney, Agent, or Firm—Rudolph J. Anderson, Jr.; Harry E. Westlake; Martin L. Katz

[57] ABSTRACT

Use of aminomethylated, water-soluble polymers to maintain or increase solution viscosity of polymer compositions useful in oil recovery processes.

8 Claims, No Drawings

PROCESS FOR THE SECONDARY OR TERTIARY RECOVERY OF PETROLEUM

This invention relates to the recovery of petroleum from subterranean oil-bearing formations.

More particularly, this invention relates to a waterflooding process employing as the flooding medium an aqueous solution of an aminomethylated, water-soluble polymer in order to maintain and increase the solution viscosity of the polymer.

In the secondary and tertiary recovery of petroleum by water flooding, it has been proposed to employ aqueous media rendered more viscous than ordinary water or brine by the incorporation therein of water-soluble agents such as high molecular weight, water-soluble polymers. However, many polymers when in aqueous solutions undergo molecular weight breakdown or degradation. Diluted polymer solutions are more susceptible to degradation than solutions of higher concentration of the polymer. The degradation is particularly rapid when the solution is kept at an elevated temperature or a medium containing substantial amounts of oxygen. This degradation results in substantial reductions in the solution viscosity.

Various chemicals have heretofore been added to polymers in order to prevent their degradation. For example, U.S. Pat. No. 3,085,063 discloses the use of formaldehyde to minimize viscosity loss in polymeric waterflooding solutions, U.S. Pat. No. 3,343,601 discloses the use of sodium hydrosulfite and sodium sulfite to prevent polymer degradation, U.S. Pat. No. 3,747,676 discloses the use of formaldehyde to maintain the solution viscosity of unhydrolyzed polyacrylamide and U.S. Pat. No. 3,753,939 discloses the use of thiosulfates to improve the stability of polymers against thermal and oxidative degradation.

Many of these known additives, however, have not been entirely satisfactory in stabilizing polymeric solutions. For example, in certain instances these additives adversely affect other properties of the polymers.

Accordingly, it is an object of this invention to provide an oil recovery process in which the effectiveness of the polymeric additive is maintained or enhanced under operating conditions.

It is a further object of this invention to provide an oil recovery process which increases the recovery of petroleum from a subterranean reservoir.

These and other objects of this invention are accomplished by the process of this invention in which aqueous solutions of an aminomethylated, water-soluble polymer are introduced through an injection well, or wells, into an oil-bearing formation. The displaced oil is then recovered at one or more producing wells spaced from the injection wells. Aqueous liquids that may be employed to prepare the injection fluids include fresh water, oil field brines, ocean water and, in general, any aqueous fluid which may be available at the oil field site for practice of the invention.

Water-soluble, polymeric mobility control agents often employed include the acrylic amide polymers such as high molecular weight homopolymers of unhydrolyzed acrylamide or partially hydrolyzed acrylamides having from about 1 percent to about 78 percent of the carboxyamide groups hydrolyzed to carboxyl groups. Also useful are copolymers of acrylamide or partially hydrolyzed acrylamide with other water-soluble monomers such as 2-acrylamido methylpropane sulfonic acid, diacetone acrylamide, dimethyl diallyl ammonium chloride, (3-acrylamido-3-methyl) butyl trimethyl ammonium chloride, ethylene oxide and saccharides. The molecular weight of these polymers should be at least 200,000, preferably at least 500,000.

In carrying out the process of this invention, the aminomethylated polymers may be prepared in any convenient manner, as for example, in the manner taught by U.S. Pat. Nos. 2,328,901 or 3,539,535 or by coadding the reactants directly to the flooding medium and allowing the reaction to proceed in the reservoir by means of the elevated reservoir temperatures. In addition to formaldehyde, other suitable amines include secondary amines of the formula:

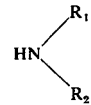

wherein $R_1$ and $R_2$ are each independently selected from alkyl groups having from 1 to 5 carbon atoms. The molar ratio of reactants used in the preparation of the aminomethylated polymers, i.e., moles of amine/moles of formaldehyde/moles of acrylamide is maintained within the range of (0.01/0.01/1) to (2/2/1). The polymer flooding medium can contain from about 0.0025 to about 0.5 percent by weight polymer, preferably from about 0.005 to about 0.15 percent by weight. Oxygen can be removed from the solution, if desired, by mechanical means such as vacuum deaeration or counter-current gas stripping or by chemical means such as the addition of an oxygen scavenger such as sodium sulfite or hydrazine.

The following examples illustrate the viscosity improving properties of the process of this invention.

EXAMPLE 1

Polymer solutions were prepared by dissolving 600 mg. of polymer in a liter of fresh water. After mixing, the viscosity of the polymer solutions was measured with a Brookfield Model LVT with U. L. Adapter at 3, 6, 12, 30 and 60 rpm. A portion of the polymer solutions was capped in a bottle and placed in an oven at 205°F., the sample cooled to room temperature and the viscosity measured.

The following tables set forth the viscosity data for a partially hydrolyzed (17%), high molecular weight polyacrylamide (Table I), a high molecular weight copolymer of 85 weight percent acrylamide and 15 weight percent 2-acrylamido methylpropane sulfonic acid (Table II) and a unhydrolyzed, high molecular weight polyacrylamide (Table III).

Table I

| | Polymer Solution - No Additive | | Aminomethylated Polymer |
|---|---|---|---|
| RPM | Not Heated | Heated 6 Days | Heated 2 Days |
| 3 | 8.8 | 8.4 | 14.2 |
| 6 | 8.1 | 7.7 | 12.6 |
| 12 | 7.5 | 7.2 | 11.15 |
| 30 | 6.34 | 6.48 | 9.10 |
| 60 | 5.61 | 5.86 | 7.67 |

Table II

| | Polymer Solution - No Additive | | Aminomethylated Polymer |
|---|---|---|---|
| RPM | Not Heated | Heated 3 Days | Heated 3 Days |
| 3 | 7.4 | 7.0 | 17.2 |
| 6 | 6.5 | 6.7 | 14.4 |
| 12 | 6.15 | 6.15 | 12.3 |
| 30 | 5.24 | 5.20 | 9.74 |
| 60 | 4.61 | 4.58 | 8.19 |

Table III

| | Aminomethylated Polymer | | |
|---|---|---|---|
| RPM | Initial Solution | Not Heated 2 Days | Heated 2 Days |
| 3 | 6.0 | 5.3 | 9.2 |
| 6 | 5.4 | 5.0 | 8.2 |
| 12 | 5.0 | 4.65 | 7.15 |
| 30 | 4.42 | 4.14 | 6.32 |
| 60 | 4.02 | 3.80 | 5.61 |

The aminomethylated polymer solutions represented in Table I and Table II were prepared by dissolving polymer, dimethyl amine, and formaldehyde in that sequence such that the final concentrations were 600, 450, and 375 mg/l, respectively, while the product represented in Table III was manufactured as an aminomethylated polymer and dissolved to a concentration of 600 mg/l.

We claim:

1. A process for the secondary or tertiary recovery of petroleum from subterranean formations penetrated by an injection well and a producing well which comprises introducing into said reservoir through said injection well a displacing medium to displace said petroleum from the reservoir, said displacing medium comprising water and an aminomethylated polymer having a molecular weight of at least 200,000, said polymer being selected from the group consisting of polyacrylamide, partially hydrolyzed polyacrylamide and copolymers of acrylamide and 2-acrylamido methyl propane sulfonic acid wherein the amino substituent of the polymer is prepared from amines of the formula:

wherein $R_1$ and $R_2$ are each independently selected from alkyl groups having from 1 to 5 carbon atoms in order to increase the solution viscosity of said displacing medium.

2. A process as in claim 1 wherein the polymer is polyacrylamide.

3. A process as in claim 2 wherein the polymer is a partially hydrolyzed polyacrylamide.

4. A process as in claim 1 wherein the polymer is a copolymer of acrylamide and 2-acrylamido methyl propane sulfonic acid.

5. A process as in claim 1 which further comprises maintaining the displacing medium in a substantially oxygen-free condition.

6. A process as in claim 1 wherein the concentration of the polymer is at least 0.0025 weight percent.

7. A process as in claim 1 wherein the aminomethylated polymer is prepared prior to injection.

8. A process as in claim 1 wherein the aminomethylated polymer is prepared in the reservoir by coadding the reactants directly to the flooding medium.

* * * * *